(12) United States Patent
Pilger

(10) Patent No.: US 6,470,588 B1
(45) Date of Patent: Oct. 29, 2002

(54) LAWN MOWER REEL ASSEMBLY MEASURING SYSTEM

(76) Inventor: Mark Pilger, 4505 Sylvan Ramble, Tampa, FL (US) 33609

( * ) Notice: Subject to any disclaimer, the term of this patent is extended or adjusted under 35 U.S.C. 154(b) by 1 day.

(21) Appl. No.: 09/608,254

(22) Filed: Jun. 30, 2000

(51) Int. Cl.$^7$ ................................................. G01B 3/10
(52) U.S. Cl. ............................. 33/759; 33/755; 33/758; 33/770; 33/555.4
(58) Field of Search ........................ 33/710, 755, 758, 33/759, 760, 770, 530, 555.1, 555.4, 832, 833

(56) References Cited

U.S. PATENT DOCUMENTS

| | | | | | |
|---|---|---|---|---|---|
| 1,672,913 A | * | 6/1928 | Schaap | ...................... | 33/555.4 |
| 3,849,886 A | * | 11/1974 | Weyrick et al. | ............... | 33/2 R |
| 4,214,369 A | * | 7/1980 | Wasik et al. | .................. | 33/759 |
| 4,294,016 A | * | 10/1981 | Wilkerson | ................... | 33/761 |
| 4,441,258 A | * | 4/1984 | McDaniel et al. | ............ | 33/759 |
| 4,811,489 A | * | 3/1989 | Walker | ......................... | 33/759 |
| 4,924,597 A | * | 5/1990 | Tursi | ............................ | 33/759 |
| 4,928,401 A | * | 5/1990 | Murray, Jr. | ................... | 33/645 |
| 5,452,523 A | * | 9/1995 | Jansen | ....................... | 33/555.4 |
| 5,913,586 A | * | 6/1999 | Marshall | ...................... | 33/759 |
| 6,073,983 A | * | 6/2000 | Schroeder | .................... | 33/760 |
| 6,175,813 B1 | * | 1/2001 | Purchase et al. | ........... | 33/555.1 |
| 6,178,655 B1 | * | 1/2001 | Potter et al. | .................. | 33/759 |

\* cited by examiner

*Primary Examiner*—Diego Gutierrez
*Assistant Examiner*—Madeline Gonzalez

(57) ABSTRACT

A measuring system comprises a flexible tape fabricated of an essentially inextensible material with a short leading edge and a short parallel trailing edge, long parallel side edges, a front face and a rear face. An attachment member is secured to the tape adjacent to the leading edge and adapted to be releasably secured to an object to be measured whereby the remainder of the tape may be wrapped around the object for determining an approximate diameter. Indicia on the front face includes equally spaced major markings, equally spaced minor markings at every tenth between the major markings, and miniature markings between the minor markings.

1 Claim, 2 Drawing Sheets

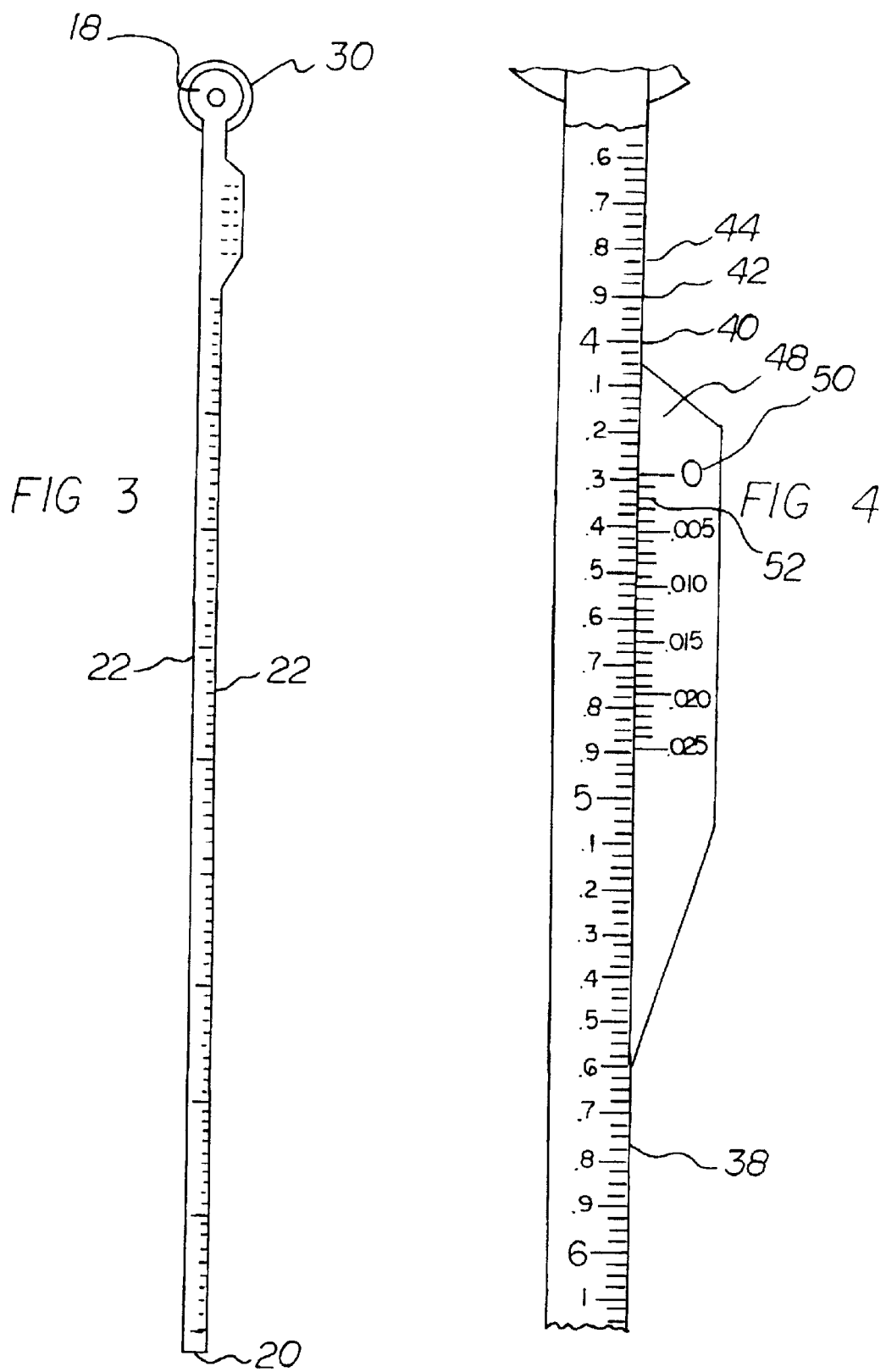

LAWN MOWER REEL ASSEMBLY MEASURING SYSTEM

BACKGROUND OF THE INVENTION

1. Field of the Invention

The present invention relates to a lawn mower reel assembly measuring system and more particularly pertains to determining the taper in a reel assembly of a lawn mower.

2. Description of the Prior Art

The use of flexible measuring tapes of known designs and configurations is known in the prior art. More specifically, flexible measuring tapes of known designs and configurations previously devised and utilized for the purpose of measuring objects with a flexible tape through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,849,886 to Weyrick et al discloses a tape measure. U.S. Pat. No. 4,214,369 to Wasik et al discloses a pasta measurer. U.S. Pat. No. 4,294,016 to Wilkerson discloses an automobile height gauge. U.S. Pat. No. 4,928,401 to Murray, Jr. discloses a shaft alignment system. Lastly, U.S. Pat. No. 5,452,523 to Jansen discloses banding material lengths.

While these devices fulfill their respective, particular objectives and requirements, the aforementioned patents do not describe lawn mower reel assembly measuring system that allows determining the taper in a reel assembly of a lawn mower.

In this respect, the lawn mower reel assembly measuring system according to the present invention substantially departs from the conventional concepts and designs of the prior art, and in doing so provides an apparatus primarily developed for the purpose of determining the taper in a reel assembly of a lawn mower.

Therefore, it can be appreciated that there exists a continuing need for a new and improved lawn mower reel assembly measuring system which can be used for determining the taper in a reel assembly of a lawn mower. In this regard, the present invention substantially fulfills this need.

SUMMARY OF THE INVENTION

In view of the foregoing disadvantages inherent in the known types of flexible measuring tapes of known designs and configurations now present in the prior art, the present invention provides an improved lawn mower reel assembly measuring system. As such, the general purpose of the present invention, which will be described subsequently in greater detail, is to provide a new and improved lawn mower reel assembly measuring system and method which has all the advantages of the prior art and none of the disadvantages.

To attain this, the present invention essentially comprises a lawn mower reel assembly measuring system for determining the taper in a reel assembly of a lawn mower. First provided is a flexible tape fabricated of an essentially inextensible material. The tape has a short leading edge and a short parallel trailing edge. The tape also has long parallel side edges between the short leading edge and the short trailing edge. The tape has a front face and a rear face. A circular magnet is next provided. The magnet, or hook, is secured to the tape adjacent to the leading edge and adapted to be releasably secured to one face of a blade of a reel type lawn mower whereby the remainder of the tape may be wrapped around the reel assembly for determining the approximate circumference and diameter of the reel assembly of a lawn mower. Indicia is provided on the front face. The indicia includes equally spaced major markings with about 3.1416 inches between the major markings. Equally spaced minor markings are provided at every tenth of an inch between the major markings. Miniature markings are provided every fortieth of an inch between the minor markings. A vernier scale extends laterally offset from one side edge of the tape adjacent to the leading edge with equally spaced primary vernier markings at about 0.000, 0.005, 0.010, 0.015, 0.020, and 0.025 of an inch. Four equally spaced supplemental vernier markings are provided between each primary vernier marking. The 0.000 marking is offset from the 4.29 location of the front face and the 0.025 marking is offset from the 4.89 marking of the front face. In this manner, the tape may be wrapped around the blades of a reel assembly of a reel type lawn mower to determine its diameter and through wrapping and measuring at different locations of the reel assembly, the taper of the blades may be determined to assist in proper grinding.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawn mower reel assembly measuring system which has all of the advantages of the prior art flexible measuring tapes of known designs and configurations and none of the disadvantages.

It is another object of the present invention to provide a new and improved lawn mower reel assembly measuring system which may be easily and efficiently manufactured and marketed.

It is further object of the present invention to provide a new and improved lawn mower reel assembly measuring system which is of durable and reliable constructions.

An even further object of the present invention is to provide a new and improved lawn mower reel assembly measuring system which is susceptible of a low cost of manufacture with regard to both materials and labor, and which accordingly is then susceptible of low prices of sale to the consuming public, thereby making such lawn mower reel assembly measuring system economically available to the buying public.

Even still another object of the present invention is to provide a lawn mower reel assembly measuring system for determining the taper in a reel assembly of a lawn mower.

Lastly, it is an object of the present invention to provide a measuring system comprising a flexible tape fabricated of an essentially inextensible material with a short leading edge and a short parallel trailing edge, long parallel side edges, a front face and a rear face. An attachment member is secured to the tape adjacent to the leading edge and adapted to be releasably secured to an object to be measured whereby the remainder of the tape may be wrapped around the object for determining an approximate diameter. Indicia on the front face includes equally spaced major markings, equally spaced minor markings at every tenth between the major markings, and miniature markings between the minor markings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevational view of the tape shown in FIGS. 1 and 2.

FIG. 4 is an enlarged front elevational view of the tape including the vernier portion shown in FIGS. 1 and 3.

The same reference numerals refer to the same parts throughout the various Figures.

DESCRIPTION OF THE PREFERRED EMBODIMENT

Figure 1:
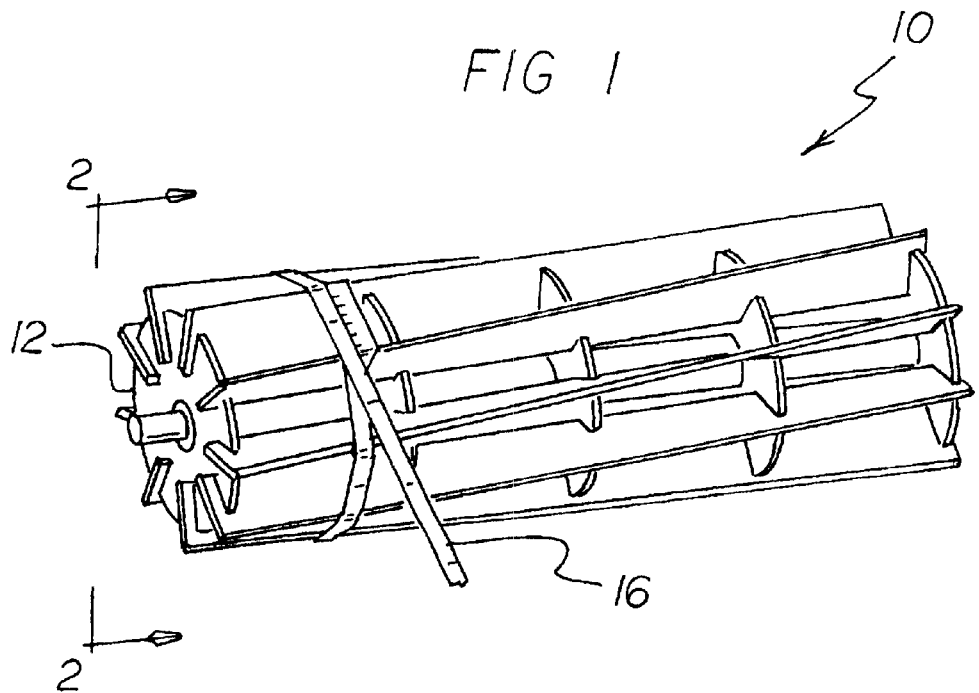
FIG. 1 is a perspective illustration of the lawn mower reel assembly constructed in accordance with the principles of the present invention.
Figure 2:
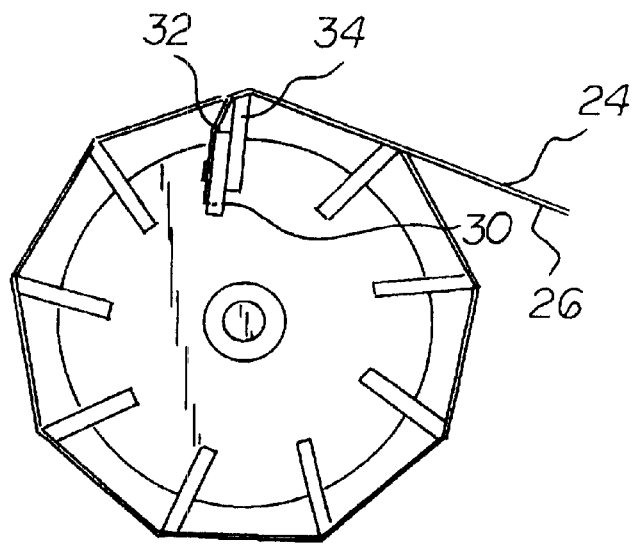
FIG. 2 is a side elevational view taken along line 2—2 of FIG. 1.

With reference now to the drawings, and in particular to FIG. 1 thereof, the preferred embodiment of the new and improved lawn mower reel assembly measuring system embodying the principles and concepts of the present invention and generally designated by the reference numeral 10 will be described.

The present invention, the lawn mower reel assembly measuring system 10 is comprised of a plurality of components. Such components in their broadest context include a flexible tape, an attachment member and indicia. Such components are individually configured and correlated with respect to each other so as to attain the desired objective. The system is used to determine the taper in a reel assembly 12 of a lawn mower.

First provided is a flexible tape 16 fabricated of an essentially inextensible material. The tape has a short leading edge 18 and a short parallel trailing edge 20. The tape also has long parallel side edges 22 between the short leading edge and the short trailing edge. The tape has a front face 24 and a rear face 26.

A circular magnet 30 is next provided. The magnet is secured to the tape adjacent to the leading edge and adapted to be releasably secured to one face 32 of a blade 34 of a reel type lawn mower whereby the remainder of the tape may be wrapped around the reel assembly for determining the approximate circumference and diameter of the reel assembly of a lawn mower.

Indicia 38 is provided on the front face. The indicia includes equally spaced major markings 40 with about 3.1416 inches between the major markings. Equally spaced minor markings 42 are provided at every tenth of an inch between the major markings. Miniature markings 44 are provided every fortieth of an inch between the minor markings.

A vernier scale 48 extends laterally offset from one side edge of the tape adjacent to the leading edge with equally spaced primary vernier markings 50 at about 0.000, 0.005, 0.010, 0.015, 0.020, and 0.025 of an inch. Four equally spaced supplemental vernier markings 52 are provided between each primary vernier marking. The 0.000 marking is offset from the 4.29 location of the front face and the 0.025 marking is offset from the 4.89 marking of the front face. In this manner, the tape may be wrapped around the blades of a reel assembly of a reel type lawn mower to determine its diameter and through wrapping and measuring at different locations of the reel assembly, the taper of the blades may be determined to assist in proper grinding.

From the foregoing it may be appreciated that the present invention is a reel assembly measuring device for measuring the circumference and diameter and hence the taper in a reel mower. The determination of the circumference or diameter of the reel assembly at two or more locations along the length of the axis of the reel assembly will determine the taper in the blades as may have occurred through an improper prior grinding or through normal use. Following such determination, proper grinding may be done and then rechecked through re-measuring by the present invention. The reel assembly has a central axial shaft with a plurality of twisted blades situated there around in a generally parallel orientation with respect to the shaft. The measuring device is a pi tape made from flexible material and an attachment member such as a hook or a magnet for attaching to one of the blades of the reel assembly. The pi tape measures the diameter of the reel by wrapping around the circumference. It is granted so that each major marking is 3.1416 inches long or pi ($\pi$) inches long. Millimeters may be substitutes for inches if desired. This will automatically convert the approximate circumference into a diameter. The pi tape also has a vernier, which makes it capable of measuring the diameter of the reel to 0.001 inches (0.02 mm). The pi tape is different from existing technology because it is flexible enough to follow the contour of the reel as defined by its blades.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn mower reel assembly measuring system for determining the taper in a reel assembly of a lawn mower comprising, in combination:

a flexible tape fabricated of an essentially inextensible material and having a short leading edge and a short parallel trailing edge and with long parallel side edges there between including a first side edge and a second edge, the first side edge being linear along its entire length and devoid of markings, the tape having a front face and a rear face;

a magnet secured to the tape adjacent to the leading edge and adapted to be releasably secured to one face of a blade of a reel type lawn mower whereby the remainder of the tape may be wrapped around the reel assembly for determining the approximate circumference and diameter of the reel assembly of a lawn mower;

indicia on the front face including equally spaced major markings along the majority of the second side edge with about 3.1416 inches between the major markings and with equally spaced minor markings at every tenth of an inch between the major markings and with miniature markings every fortieth of an inch between the minor markings;

a vernier scale extending laterally offset from the second side edge of the tape adjacent to the leading edge with equally spaced primary vernier markings at about 0.000, 0.005, 0.010, 0.015, 0.020, and 0.025 of an inch with four equally spaced supplemental vernier markings between each primary vernier marking, the 0.000 marking being offset from the 4.29 location of the front face and the 0.025 marking being offset from the 4.89 marking of the front face;

whereby the tape may be wrapped around the blades of a reel assembly of a reel type lawn mower to determine its diameter and through wrapping and measuring at different locations of the reel assembly, the taper of the blades may be determined to assist in proper grinding.

* * * * *